US012195310B2

(12) United States Patent
Watanabe et al.

(10) Patent No.: US 12,195,310 B2
(45) Date of Patent: Jan. 14, 2025

(54) CRANE

(71) Applicant: KOBELCO CONSTRUCTION MACHINERY CO., LTD., Hiroshima (JP)

(72) Inventors: Takuya Watanabe, Hyogo (JP); Shoji Watanabe, Hyogo (JP); Keiji Sakai, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 263 days.

(21) Appl. No.: 17/629,768

(22) PCT Filed: Jul. 22, 2020

(86) PCT No.: PCT/JP2020/028500

§ 371 (c)(1),
(2) Date: Jan. 24, 2022

(87) PCT Pub. No.: WO2021/020291

PCT Pub. Date: Feb. 4, 2021

(65) Prior Publication Data

US 2022/0250880 A1 Aug. 11, 2022

(30) Foreign Application Priority Data

Jul. 30, 2019 (JP) ................................ 2019-139568

(51) Int. Cl.
*B66C 23/82* (2006.01)
*B66C 23/36* (2006.01)

(52) U.S. Cl.
CPC ............ *B66C 23/821* (2013.01); *B66C 23/36* (2013.01); *B66C 2700/0371* (2013.01)

(58) Field of Classification Search
CPC ....... B66C 23/06; B66C 23/82; B66C 23/821; B66C 23/36; B66C 23/62; B66C 23/64;
(Continued)

(56) References Cited

U.S. PATENT DOCUMENTS 3,072,265 A 1/1963 Nickles
3,534,869 A 10/1970 West
(Continued)

FOREIGN PATENT DOCUMENTS

DE 202015008775 U1 * 5/2017 ............. B66C 23/62
JP H09278369 A * 10/1997
(Continued)

OTHER PUBLICATIONS

Extended European Search Report issued on Jul. 3, 2023 in European Patent Application No. 20845920.6, 7 pages.
(Continued)

*Primary Examiner* — Michael R Mansen
*Assistant Examiner* — Henrix Soto
(74) *Attorney, Agent, or Firm* — Oblon, McClelland, Maier & Neustadt, L.L.P.

(57) ABSTRACT

Provided is a crane including a guy link coupling part easily accommodatable at a predetermined position thereof. The guy link coupling part has a pair of left and right link members each extending in a front-rear direction, and a coupling member extending in a left-right direction and connecting the pair of link members to each other. A linking and retaining structure includes a first retainer provided on a boom for retaining the coupling member to restrict the coupling member from moving in the front-rear direction. The first retainer has: a first slope surface slanting inward of the boom, from a proximal position of the boom toward a distal end thereof; a second slope surface located closer to the distal end of the boom than the first slope surface and
(Continued)

slanting outward of the boom; and a recess part disposed between the first slope surface and the second slope surface.

10 Claims, 3 Drawing Sheets

(58) Field of Classification Search
CPC .. B66C 23/68; B66C 23/70; B66C 2700/0371
USPC .......................................................... 212/232
See application file for complete search history.

(56) References Cited

U.S. PATENT DOCUMENTS

| | | | | |
|---|---|---|---|---|
| 9,127,804 | B2 * | 9/2015 | Neuffer | B66C 23/823 |
| 2005/0098523 | A1 * | 5/2005 | Mizuta | B66C 23/82 212/298 |
| 2018/0072540 | A1 | 3/2018 | Stangl | |
| 2019/0106303 | A1 * | 4/2019 | Kuninaga | B66C 23/42 |
| 2020/0165108 | A1 | 5/2020 | Kurihara | |
| 2021/0171323 | A1 | 6/2021 | Takaoka | |

FOREIGN PATENT DOCUMENTS

| | | | | |
|---|---|---|---|---|
| JP | H10120371 | A | * | 5/1998 |
| JP | 2001010782 | A | * | 1/2001 |
| JP | 2002179388 | A | * | 6/2002 |
| JP | 2017218309 | A | * | 12/2007 |
| JP | 2016222398 | A | * | 12/2016 |
| JP | 2017-7777 | A | | 1/2017 |
| JP | 2018020902 | A | * | 2/2018 |
| JP | 2018-80052 | A | | 5/2018 |
| JP | 2019-34833 | A | | 3/2019 |
| JP | 2019-119542 | A | | 7/2019 |
| WO | WO 2019/111642 | A1 | | 6/2019 |

OTHER PUBLICATIONS

International Search Report mailed on Aug. 25, 2020 in PCT/JP2020/028500 filed on Jul. 22, 2020, 2 pages.

* cited by examiner

CRANE

TECHNICAL FIELD

The present invention relates to a crane which includes a guy line including: a guy link; and a guy cable, and connects a boom and a mast to each other.

BACKGROUND ART

Patent Literature 1 discloses a link storing device and a link storing method for use in a crane for storing a guy link so that at least a part of the guy link is located on a top surface or a side surface of a first rising and falling member at an outer position in a width direction of a second rising and falling member. The guy link is storable in the rising and falling member without the necessity of being detached from the rising and falling member. This suppresses the labor and time required to attach and detach the guy link from to and from the rising and falling member.

Furthermore, a crane including, in addition to a boom, a jib tiltably supported at a distal end of the boom and a mast supported on a crane main body behind the boom has been known.

CITATION LIST

Patent Literature

Patent Literature 1: Japanese Unexamined Patent Publication No. 2019-34833

For instance, a specification of a long boom including a jib, a part of which serves as a part of the boom, is adopted. In this case, a guy link located closer to the boom and a guy cable located closer to the jib are connected to each other to form a guy line. The guy line connects a distal end of a mast and a distal end of the boom to support the long boom. However, a width guy link (guy link coupling part) corresponding to a connection section with a guy cable in the guy link deviates from a predetermined storage or accommodating position toward a proximal end of the boom when the guy cable stretches due to the weight of the guy link or a tensile force of the guy line in a specific operation. As a result, this configuration has a problem of a difficulty in storing the width guy link at a predetermined position in storing of the guy line. Further, when the guy cable stretches in disassembling of the boom, another problem is seen in a difficulty in removing a pin connecting the guy cable and the width guy link or a pin connecting a plurality of cables constituting the guy cable to teach other due to a tensile force occurring in each of the guy cable and the width guy link.

SUMMARY OF INVENTION

An object of the present invention is to provide a crane including a guy link coupling part easily accommodatable at a predetermined position thereof.

A crane provided by the present invention includes: a crane main body; a boom supported on the crane main body rotatably in a tilting direction; a mast supported on the crane main body rotatably in the tilting direction behind the boom; a guy line which connects a distal end of the mast and a distal end of the boom to each other; and a linking and retaining structure provided on the boom. The guy line includes; a guy link located closer to the mast and extending in a connection direction from the distal end of the mast toward the distal end of the boom; and a pair of guy cables located closer to the boom, extending in the connection direction, and spaced from each other at a distance in a left-right direction perpendicularly intersecting the connection direction, each of the guy cables having a cable proximal end connected to the guy link and a cable distal end connected to the distal end of the boom. The guy link has: a pair of guy link main bodies each extending in the connection direction and spaced from each other at a distance furtherer than the distance between the pair of guy cables in the left-right direction, each of the guy link main bodies having a link proximal end connected to the distal end of the mast; and a guy link coupling part connected to respective distal ends of the pair of guy link main bodies. The guy link coupling part has: a pair of link members spaced from each other in the left-right direction and linking the pair of guy cables and the pair of guy link main bodies to each other in the connection direction; and a coupling member extending in the left-right direction and connecting the pair of link members to each other in the left-right direction. The linking and retaining structure includes at least one first retainer provided on the boom for retaining the coupling member to restrict the coupling member from moving in a boom extension direction in which the boom extends from the crane main body. The at least one first retainer has: a first slope surface slanting to an inside of the boom as advancing in the boom extension direction; a second slope surface located closer to a distal position than the first slope surface in the boom extension direction, and slanting to an outside of the boom as advancing in the boom extension direction; and a recess part disposed between the first slope surface and the second slope surface in the boom extension direction and connecting the first slope surface and the second slope surface to each other to receive the coupling member of the guy link coupling part in a direction perpendicularly intersecting the boom extension direction.

DESCRIPTION OF EMBODIMENTS

Hereinafter, a preferable embodiment of the present invention will be described with reference to the accompanying drawings.

Configuration of Crane

Figure 1:
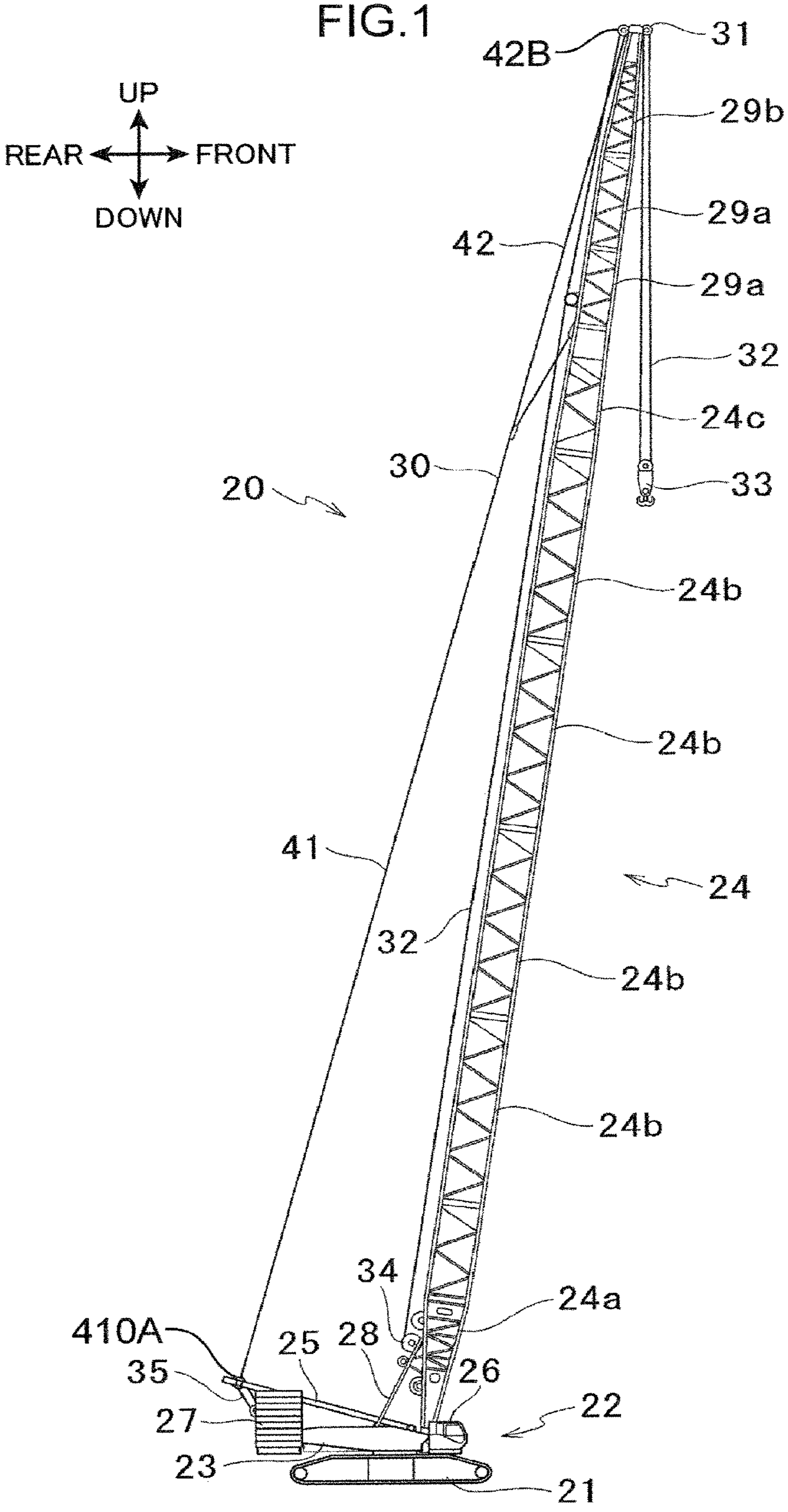
FIG. 1 is a sideview of a crane according to an embodiment of the present invention.

FIG. 1 is a sideview of a crane 20 according to an embodiment of the present invention. The crane 20 is provided with a link retaining structure (linking and retaining structure) according to the embodiment. As shown in FIG. 1, the crane 20 includes a lower traveling body 21 of a crawler type and an upper slewing body 22 (crane main body) slewably mounted on the lower traveling body 21. The crane 20 may be a mobile crane using an alternative moving part (e.g., wheel) other than crawlers, or a fixed crane without a moving part.

The upper slewing body 22 has a slewing frame 23. The crane 20 further includes a boom 24, a mast 25, a cab 26, a counterweight 27, a backstop 28, a boom guy line 30, a winding-up rope 32, a hook 33, a hook winch 34, and a boom raising and lowering rope 35.

The slewing frame 23 is attached to the lower traveling body 21 via an unillustrated slewing bearing. The boom 24 is connected to (supported on) a front portion of the slewing frame 23 rotatably in a tilting direction with respect to the slewing frame 23. The boom 24 has a distal end to which one end of the boom guy line (guy line) 30 is connected.

In the embodiment, the boom 24 includes a lower boom 24*a*, a plurality of intermediate booms 24*b*, a taper boom 24*c*, a plurality of intermediate jibs 29*a*, and an upper jib 29*b*. The intermediate jibs 29*a*, the upper jib 29*b*, and an unillustrated lower jib may constitute a jib as another tiltable member which is different from the boom 24, but constitutes a part of the boom 24 in the embodiment. Here, the intermediate jibs 29*a* and the upper jib 29*b* may constitute a part of the boom 24 without constituting the jib.

The upper jib 29*b* has a jib point sheave 31 at a distal end thereof. The hook 33 is hanged from the jib point sheave 31 via the winding-up rope 32. The hook winch 34 provided on the boom 24 winds up or unwinds the winding-up rope 32 to raise or lower the hook 33.

The mast 25 is provided (supported) on the slewing frame 23 behind the boom 24 rotatably in the tilting direction. A rotation central axis of the boom 24 and a rotation central axis of the mast 25 in their respective rotations are parallel to each other and extend in a direction (left-right direction) perpendicularly intersecting the plane of paper of FIG. 1. A distal end of the mast 25 and the distal end of the boom 24 are connected to each other via the boom guy line 30. Further, the distal end (unillustrated upper spreader) of the mast 25 and an unillustrated lower spreader provided in a rear portion of the slewing frame 23 are connected to each other via the boom raising and lowering rope 35. The slewing frame 23 is provided with an unillustrated winch which winds up or unwinds the boom raising and lowering rope 35 to raise or lower the mast 25. This results in allowing the boom guy line 30 to raise or lower the boom 24 connected to the mast 25.

The counterweight 27 is mounted on the rear portion of the slewing frame 23. The counterweight 27 is a weight to keep a balance with a hoisted load of the crane 20. The backstop 28 is attached to a lower portion of a back surface of the boom 24, and extends from the back surface of the boom 24 to the slewing frame 23. The backstop 28 received by an unillustrated backstop receiver fixedly attached to the slewing frame 23 restricts the boom 24 from rotating rearward.

Configuration of Taper Boom

Figure 2:
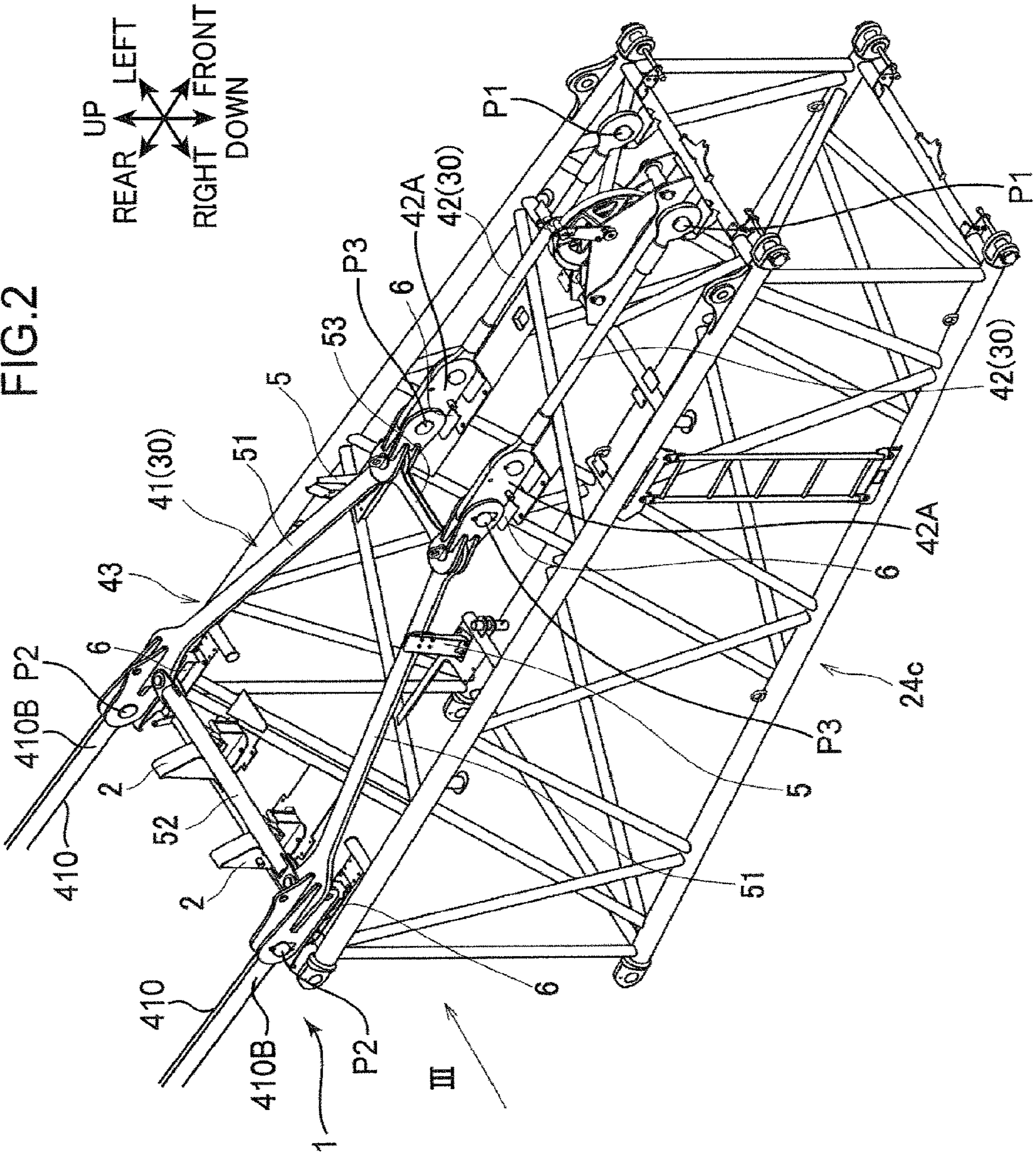
FIG. 2 is a perspective view of a taper boom included in the crane according to the embodiment of the present invention.

FIG. 2 is a perspective view of the taper boom 24*c* of the crane 20 according to the embodiment. FIG. 2 corresponds to a perspective view of the taper boom 24*c* in a state where the boom 24 shown in FIG. 1 is lowered frontward to lie with respect to the upper slewing body 22. As shown in FIG. 2, the taper boom 24*c* has a trapezoidal shape tapering from a position closer to a proximal end (at the rear in the drawing) of the boom 24 toward the distal end (at the front in the drawing) thereof.

In the embodiment, the boom guy line 30 is a member which connects the distal end of the boom 24 and the distal end of the mast 25 to each other, and includes a guy link 41 and a pair of left and right guy cables 42.

As shown in FIG. 1, the guy link 41 is located closer to the mast 25 in the boom guy line 30 and extends in a connection direction from the distal end of the mast 25 toward the distal end of the boom 24.

The left and right guy cables 42 are located closer to the boom 24 in the boom guy line 30. The guy cables 42 extend in the connection direction and are spaced from each other at a distance in a left-right direction perpendicularly intersecting the connection direction (see FIG. 2). Each of the guy cables 42 has a cable proximal end 42A (FIG. 2) connected to the guy link 41 and a cable distal end 42B (FIG. 1) connected to the distal end of the boom 24. The guy cable 42 includes a net-shaped thick and stiff member formed of twisted wires, such as iron wires and steel wires. FIG. 2 shows corresponding one of cable members constituting each of the left and right guy cables 42. Specifically, the cable members having the same structure as each cable member shown in FIG. 2 are sequentially connected by pins P1 frontward in FIG. 2 to thereby form the pair of left and right guy cables 42.

Moreover, the guy link 41 has a pair of left and right guy link main bodies 410 and a width guy link 43 (guy link coupling part) as shown in FIG. 2.

The left and right guy link main bodies 410 extend in the connection direction and are spaced from each other at a distance further than the distance between the left and right guy cables 42 in the left-right direction. Each of the guy link main bodies 410 has a link proximal end 410A (FIG. 1) connected to the distal end of the mast 25.

The width guy link 43 is connected to a distal end 410B (located opposite the link proximal end 410A) of each of the guy link main bodies 410 by a pin P2 (FIG. 2). The width guy link 43 is connected to the cable proximal end 42A of each of the guy cables 42 by a pin P3. In other words, a connection section with the guy cables 42 in the guy link 41 serves as the width guy link 43. Specifically, the boom guy line 30 includes the guy link 41 extending from the distal end of the mast 25 to the width guy link 43, and the guy cables 42 extending from a section of the boom guy line just above the width guy link 43 to the distal end of the boom 24. The width guy link 43 serves to link the pair of guy cables 42 and the pair of guy link main bodies 410 to each other despite the difference in the distances or widths between the guy cables and between the guy link main bodies in the left-right direction. Further, the guy link 41 is mainly composed of a plate member, and thus has a higher strength than each of the guy cables 42. In this respect, the guy link 41 is considered as much less stretchable than the guy cable 42 in a standing state of the boom 24 shown in FIG. 1.

As described above, a part of the jib serves as a part of the boom 24 in the embodiment. The guy link 41 and the guy cable 42 are required to be connected to each other to form the single boom guy line 30 such that a part of the jib serves as a part of the boom 24 in a configuration adopting the guy link 41 for the boom 24 and the guy cable 42 for the jib in view of weight reduction. In another embodiment, a part of the boom 24 may serve as a part of the jib.

As shown in FIG. 2, the width guy link 43 is mounted on the taper boom 24*c* in accommodating of the boom guy line 30 (in lowering of the boom 24, in transportation thereof, or the like).

The width guy link 43 has a pair of left and right link members 51, a first coupling member (coupling member) 52, and a second coupling member 53.

The left and right link members 51 are spaced from each other in the left-right direction, connect the pair of guy cables 42 and the pair of guy link main bodies 410 to each other in a front-rear direction (connection direction), and extend in a direction at a slight angle to the front-rear direction as shown in FIG. 2.

The first coupling member 52 extends in the left-right direction and connects respective ends of the link members 51 that are located closer to the proximal end of the boom 24 to each other.

The second coupling member 53 extends in the left-right direction and connect another respective ends of the link members 51 that are located closer to the distal end of the boom 24 to each other. The second coupling member 53 is shorter than the first coupling member 52. It is seen from these perspectives that the width guy link 43 has a trapezoidal shape when seen from above.

Configuration of Link Retaining Structure

The crane 20 further includes a link retaining structure 1 (linking and retaining structure, FIG. 2). The link retaining structure 1 is provided on the taper boom 24*c* of the boom 24 and can retain the width guy link 43. The link retaining structure 1 has a pair of left and right "front-rear retainers" 2 (at least one first retainer). The front-rear retainers 2 are located at a proximal end of the taper boom 24*c*. Alternatively, one, or three or more front-rear retainers 2 may be provided.

Figure 3:
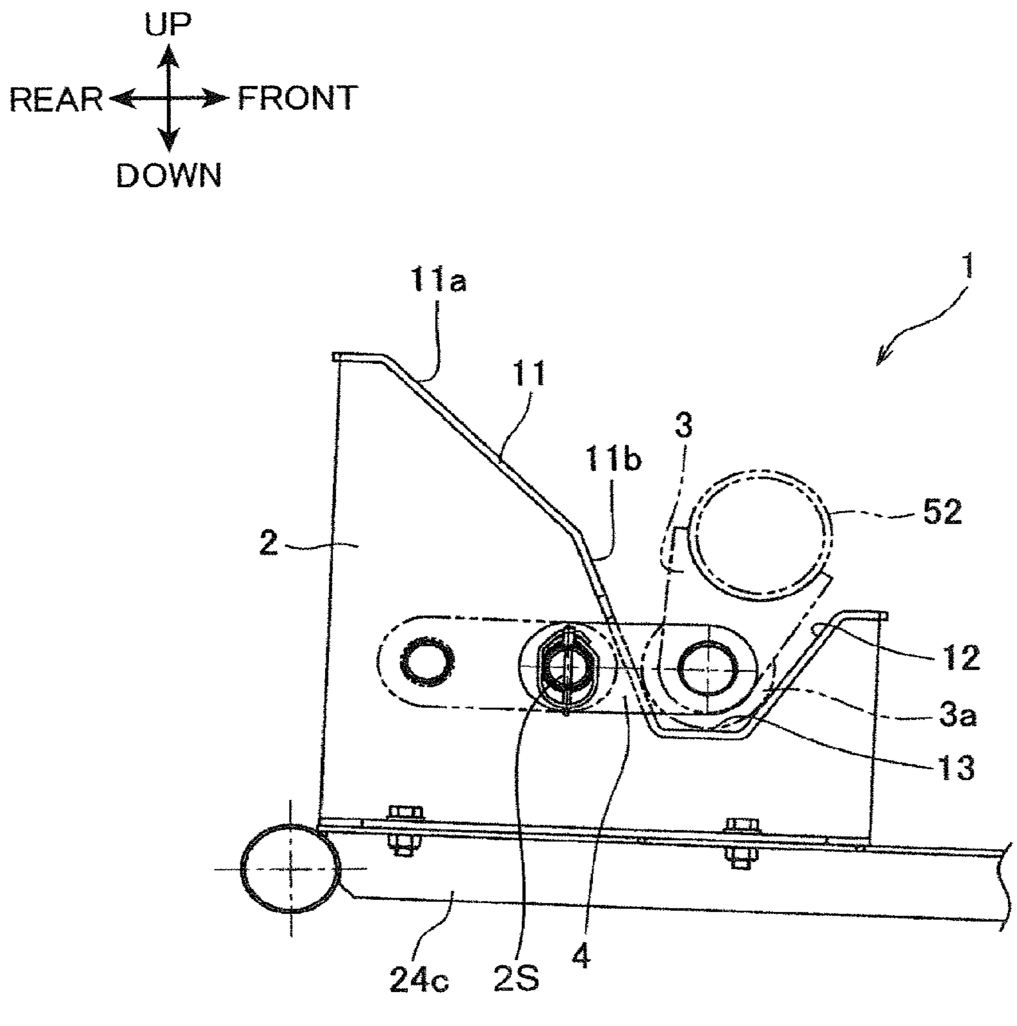
FIG. 3 is a view of a first retainer seen in a direction of arrow III in FIG. 2.

FIG. 3 is a view of the front-rear retainer 2 seen in a direction of arrow III in FIG. 2. As shown in FIG. 3, the front-rear retainer 2 has a first slope surface 11, a second slope surface 12, and a recess part 13.

The first slope surface 11 slants inward of the taper boom 24*c* (downward in the drawing), from a proximal position (at the rear in the drawing) of the taper boom 24*c* toward the distal end (frontward in the drawing) thereof. In other words, the first slope surface 11 slants to an inside of the boom 24 as advancing in a boom extension direction in which the boom 24 extends from the upper slewing body 22, and slants downward as advancing toward the distal end of the taper boom 24*c* in a lying posture of the boom 24 (taper boom 24*c*) as shown in FIG. 2.

The second slope surface 12 is located closer to the distal end of the taper boom 24*c* than the first slope surface 11, and slants outward of the taper boom 24*c* (upward in the drawing), from a proximal position of the taper boom 24*c* toward the distal end thereof. In other words, the second slope surface 12 is located closer to a distal position than the first slope surface 11 in the boom extension direction, slants to an outside of the boom 24 as advancing in the boom extension direction, and slants upward as advancing toward the distal end of the taper boom 24*c* in the lying posture of the boom 24 (taper boom 24*c*) as shown in FIG. 2.

The recess part 13 is defined between the first slope surface 11 and the second slope surface 12. Specifically, the recess part 13 is disposed between the first slope surface 11 and the second slope surface 12 in the front-rear direction (boom extension direction), and connects the first slope surface 11 and the second slope surface 12 to each other to receive the first coupling member 52 (a contact member 3 which will be described later) of the width guy link 43 in a direction (up-down direction in each of FIG. 2 and FIG. 3) perpendicularly intersecting the boom extension direction. As shown in FIG. 3, the first slope surface 11 has a larger maximum height from the recess part 13 than a maximum height of the second slope surface 12 from the recess part 13.

Moreover, the link retaining structure 1 has a pair of left and right contact members 3. The left and right contact members 3 are provided (mounted) to the first coupling member 52. The two contact members 3 are respectively allotted to the two front-rear retainers 2. Each of the contact members 3 has a distal end provided with a roller 3*a*. The roller 3*a* may rotate or may not rotate. Additionally, a resin pad may be substituted for the roller 3*a*. The contact member 3 is movable over the first slope surface 11 while contacting the first slope surface 11. In the configuration where the contact member 3 has the roller 3*a*, the roller 3*a* is preferably supported by the first coupling member 52 rotatably about a rotation central axis extending in the left-right direction. Besides, the same number of contact members 3 as the front-rear retainers 2 may be provided.

Each of the front-rear retainers 2 can retain the first coupling member 52 to restrict the first coupling member 52 from moving in the front-rear direction (boom extension direction). Particularly, the front-rear retainer 2 retains the width guy link 43 so that the width guy link 43 is at a fixed position relative to the distal end of the boom 24 in the front-rear direction (boom extension direction). Specifically, as shown in FIG. 3, the recess part 13 disposed between the first slope surface 11 and the second slope surface 12 receives the roller 3*a* fitting to a bottom of the recess part to thereby retain (hold) the first coupling member 52 in the front-rear direction. Consequently, the width guy link 43 restricted from moving in the front-rear direction is held on the taper boom 24*c* in this state.

In FIG. 1, when the guy cable 42 stretches due to a weight of the guy link 41 or a tensile force occurring in the boom guy line 30 in an operation of the crane 20, the width guy link 43 deviates from a predetermined accommodating position toward the proximal end of the taper boom 24*c* (reward in FIG. 2). The stretching of the guy cable 42 includes stretching of the twisted wires, longitudinal stretching of a plurality of wires, and a reduction in the diameter of each of the wires. In this respect, a conventional configuration has had a difficulty in accommodating the width guy link 43 at a predetermined position even with an effort of accommodating the boom guy line 30 in this situation.

Another difficulty is seen in removing the pin P3 connecting the guy cable 42 and the width guy link 43, and the pin P1 connecting the cables constituting the guy cable 42 to each other due to the tensile force occurring in the guy cable 42 and the width guy link 43 in a state where the guy cable 42 stretches in disassembling of the boom 24. The stretching of the guy cable 42 includes plastic deformation as well as elastic deformation. The boom 24 is lowered frontward to lie while the mast 25 is lowered frontward to lie from the state shown in FIG. 1 for disassembling of the crane 20. Further, the tensile force continues occurring in the boom guy line 30 depending on the weight of the boom 24 until the boom 24 fully lies over the ground. After the boom 24 is lowered to fully lie, a distance between the distal end of the boom 24 and the distal end of the mast 25 becomes shorter than that in the operation, and the guy link 41 of the boom guy line 30 has a downward projective arc shape (curves downward). At this time, it is not that the entirety of the guy link 41 is mounted (supported) on the boom 24, but a portion of the guy link 41 is hanged downward from the distal end of the mast 25. In this state, the tensile force occurring in the guy cable 42 remains, that is, at least the tensile force corresponding to the weight of the guy link 41 occurs in the guy cable. As described above, the width guy link 43 staying in the air gradually descends as the mast 25 is gradually lowered frontward. Therefore, it is difficult to bring the width guy link 43 to the predetermined accommodating position in the stretching state of the guy cable 42 as described above. Furthermore, the guy cable 42 has a possibility that an amount of its stretching gradually increases per performance of a hoisting operation. Additionally, the width guy link 43 staying in the air is likely to sway, and hence accommodating of the width guy link would be more difficult.

In the embodiment with the aim of solving the problems described above, the first slope surface 11 guides the contact member 3 of the width guy link 43 thereover to allow the width guy link 43 to move toward the distal end of the taper boom 24*c* (move frontward in FIG. 3) while descending in the accommodating of the boom guy line 30 as shown in FIG. 2 and FIG. 3. This configuration solves the deviation of the width guy link 43 in the front-rear direction. Moreover, the recess part 13 disposed between the first slope surface 11 and the second slope surface 12 receives the roller 3*a* fitting to the bottom thereof to thereby retain (hold) the first coupling member 52 in the front-rear direction. Consequently, the width guy link 43 restricted from moving in the front-rear direction is held on the taper boom 24*c* in this state. This configuration can facilitate the accommodating of the width guy link 43 at the predetermined position.

Moreover, in the accommodating of the boom guy line 30, the tensile force having occurred in each of the guy cable 42 and the width guy link 43 is released therefrom (the guy cable 42 slacks) when the deviation of the width guy link 43 in the front-rear direction as attributed to the stretching of the guy cable 42 is solved in the above-described manner. Accordingly, the operator can easily remove the pin P3 connecting the guy cable 42 and the width guy link 43, and the pin P1 connecting the cables constituting the guy cable 42 to each other. This can facilitate disassembling of the boom 24. The accommodating of the width guy link 43 at the predetermined position leads to a success in connecting the guy cable 42 and the width guy link 43 by the pin P3 (FIG. 2) and connecting the cables constituting the guy cable 42 to each other by the pin P1 (FIG. 2) in a state where no tensile force occurs in the guy cable 42 and the width guy link 43. This can facilitate assembling of the boom 24.

As shown in FIG. 3, the first slope surface 11 has a first section 11*a* and a second section 11*b*. The first section 11*a* has a predetermined gradient with respect to the front-rear direction (boom extension direction) in a lying state of the boom 24 (taper boom 24*c*) shown in FIG. 2. The second section 11*b* is located closer to the distal end of the taper boom 24*c* than the first section 11*a* (in front in each of FIG. 2 and FIG. 3, i.e., at a distal position in the boom extension direction), and has a gradient steeper than the gradient of the first section 11*a* with respect to the front-rear direction.

The first coupling member 52 guided over the first section 11*a* is then guided over the second section 11*b*, and fits to the bottom of the recess part 13 disposed between the second section 11*b* and the second slope surface 12. This configuration including the second section 11*b* having the gradient steeper than the gradient of the first section 11*a* can suppress the movement of the first coupling member 52 toward the proximal end of the taper boom 24*c* more effectively than a configuration including a first slope surface 11 having no second section 11*b*. Consequently, this configuration can reliably retain the width guy link 43 in the front-rear direction. Further, the first slope surface 11 which has the first section 11*a* having the gradient gentler than the gradient of the second section 11*b* can be longer in the front-rear direction than a first slope surface having only a second section 11*b*. Accordingly, the first slope surface 11 can preferably guide the first coupling member 52 thereover even if the width guy link 43 seriously deviates toward the proximal end of the taper boom 24*c*. Additionally, the first slope surface 11 which has the first section 11*a* having the gradient gentler than the gradient of the second section 11*b* can have a decreased height in the up-down direction (vertical direction on paper of FIG. 3) in comparison with a first slope surface 11 which has only a second section 11*b* while having an equivalent length in the front-rear direction. This configuration succeeds in suppressing an increase in the height of the taper boom 24*c* in transportation.

The link retaining structure 1 further includes a connection member 4 (see FIG. 3). The connection member 4 can detachably connect the first coupling member 52 and the front-rear retainer 2 in a state where the first coupling member 52 is located between the first slope surface 11 and the second slope surface 12, i.e., where the recess part 13 receives the first coupling member 52. Specifically, the connection member 4 can connect the contact member 3 and the front-rear retainer 2 in the state where the recess part 13 disposed between the first slope surface 11 and the second slope surface 12 receives the roller 3*a* fitting to the bottom thereof. The connection member 4 is supported by the front-rear retainer 2 and shiftable between a connected position and a disconnected position. The connected position is a position for preventing the first coupling member 52 from moving relative to the front-rear retainer 2, and the disconnected position is a position for permitting the first coupling member 52 to move relative to the front-rear retainer. As shown in FIG. 3, the connection member 4 has one end supported rotatably about a shaft 2S provided on a side surface of the front-rear retainer 2. The connection member 4 has another end fixedly attached to the side surface of the front-rear retainer 2 at the disconnected position (denoted by the long-dashed double-dotted line in FIG. 3) in an operation of the crane 20. In contrast, the connection member 4 rotates about the shaft 2S to be connected to a shaft which supports the roller 3*a* thereon as denoted by the solid line in FIG. 3 to reach the connected position in accommodating of the boom guy line 30. Besides, the same number of connection members 4 as front-rear retainers 2 may be provided.

In the accommodating of the boom guy line 30, connection between the first coupling member 52 and the front-rear retainer 2 enables the front-rear retainer 2 to reliably retain the first coupling member 52. Consequently, this configuration can reliably retain the width guy link 43 in the front-rear direction.

The link retaining structure 1 further has a pair of left and right "left-right retainers" 5 (at least one second retainer) as shown in FIG. 2. The left-right retainers 5 are located on the taper boom 24*c*. Each of the left-right retainers 5 can retain the width guy link 43 to restrict the width guy link 43 from moving in the left-right direction by a contact with a corresponding side surface of the link member 51. The left-right retainer 5 has an upper portion provided with a tapering section extending downward as advancing inward in the left-right direction to easily guide the link member 51. The width guy link 43 retained in the left-right direction as well as in the front-rear direction is reliably retainable at an appropriate accommodating position in the accommodating of the boom guy line 30. As a result, for example, the width guy link 43 can maintain a normal shape. Alternatively, a single left-right retainer 5 may be provided.

The link retaining structure 1 further includes a mount base 6. Specifically, four mount bases 6 are provided on the taper boom 24*c* to support the width guy link 43 at four corners thereof from below.

As described heretofore, in the link retaining structure 1 according to the embodiment, the front-rear retainer 2 which can retain the first coupling member 52 of the width guy link 43 to restrict the first coupling member 52 from moving in the front-rear direction is provided on the taper boom 24*c*. The front-rear retainer 2 has: the first slope surface 11 slanting inward of the taper boom 24*c*, from a proximal position of the taper boom 24*c* toward the distal end thereof: the second slope surface 12 slanting outward of the taper boom 24*c*, from a proximal position of the taper boom 24*c* toward the distal end thereof; and the recess part 13 disposed between the first slope surface 11 and the second slope surface 12. Therefore, even if the width guy link 43 deviates from the predetermined accommodating position toward the proximal end of the taper boom 24*c* due to the stretching of the guy cable 42 in the operation, the first slope surface 11 guides the first coupling member 52 thereover to thereby allow the width guy link 43 to move toward the distal end of the taper boom 24 in the accommodating of the boom guy line 30. This configuration solves the deviation of the width guy link 43 in the front-rear direction as attributed to the stretching of the guy cable 42. Moreover, the recess part 13 disposed between the first slope surface 11 and the second slope surface 12 receives the first coupling member 52 fitting to the bottom thereof to thereby retain the first coupling member 52 in the front-rear direction. Consequently, the width guy link 43 restricted from moving in the front-rear direction is held on the taper boom 24*c* in this state. This configuration can facilitate the accommodating of the width guy link 43 at the predetermined position. Thus, the configuration may exclude the contact member 3 and allow the first coupling member 52 to directly fit in the recess part 13.

The tensile force having occurred in each of the guy cable 42 and the width guy link 43 is released therefrom when the deviation of the width guy link 43 in the front-rear direction is solved in the accommodating of the boom guy line 30. Accordingly, the pin P3 connecting the guy cable 42 and the width guy link 43, and the pin P1 connecting the cables constituting the guy cable 42 to each other are easily removable. This can facilitate the disassembling of the boom 24. The accommodating of the width guy link 43 at the predetermined position leads to a success in connecting the guy cable 42 and the width guy link 43 by the pin P3 and connecting the cables constituting the guy cable 42 to each other by the pin 1 in a state where no tensile force occurs in the guy cable 42 and the width guy link 43. This can facilitate the assembling of the boom 24.

Moreover, the first slope surface 11 has the first section 11*a* having the predetermined gradient and the second section 11*b* having the gradient steeper than the gradient of the first section 11*a*. The first coupling member 52 guided over the first section 11*a* is then guided over the second section 11*b*, and fits to the bottom of the recess part 13 disposed between the second section 11*b* and the second slope surface 12. This configuration including the second section 11*b* having the gradient steeper than the gradient of the first section 11*a* can suppress the movement of the first coupling member 52 toward the proximal end of the taper boom 24 more effectively than a configuration including a first slope surface 11 having no second section 11*b*. Consequently, this configuration can reliably retain the width guy link 43 in the front-rear direction. Further, the first slope surface 11 which has the first section 11*a* having the gradient gentler than the gradient of the second section 11*b* can be longer in the front-rear direction than a first slope surface having only a second section 11*b*. Accordingly, the first slope surface 11 can preferably guide the first coupling member 52 thereover even if the width guy link 43 seriously deviates from the predetermined accommodating position toward the proximal end of the taper boom 24*c*. Additionally, the first slope surface 11 which has the first section 11*a* having the gradient gentler than the gradient of the second section 11*b* can have a decreased height in the up-down direction (vertical direction on paper of FIG. 3) in comparison with a first slope surface 11 which has only a second section 11*b* while having an equivalent length in the front-rear direction. This configuration succeeds in suppressing an increase in the height of the taper boom 24*c* in transportation.

Moreover, the first coupling member 52 is provided with the contact member 3 movable over the first slope surface 11 while contacting the first slope surface 11. The contact member 3 moving over the first slope surface 11 in this manner achieves a smooth guide of the first coupling member 52.

The connection member 4 can connect the first coupling member 52 and the front-rear retainer 2 in the state where the first coupling member 52 is located between the first slope surface 11 and the second slope surface 12. In the accommodating of the boom guy line 30, connection between the first coupling member 52 and the front-rear retainer 2 enables the front-rear retainer 2 to reliably retain the first coupling member 52. Consequently, this configuration can reliably retain the width guy link 43 in the front-rear direction.

Furthermore, the pair of left-right retainers 5 which can retain the width guy link 43 to restrict the width guy link 43 from moving in the left-right direction as well as in the front-rear direction is located on the taper boom 24*c*. The width guy link 43 retained in the left-right direction as well as in the front-rear direction is reliably retainable at an appropriate accommodating position in the accommodating of the boom guy line 30. As a result, for example, the width guy link 43 can maintain a normal shape.

The embodiment of the present invention is described heretofore, but are merely described as examples without particularly limiting the present invention. It is the matter of design choice for changes in the details of the configuration. Furthermore, the operations and effects described in the embodiments of the present invention are merely listed as optimal operations and effects attained by the present invention, and thus should not be limited thereto.

A crane provided by the present invention includes: a crane main body; a boom supported on the crane main body rotatably in a tilting direction; a mast supported on the crane main body rotatably in the tilting direction behind the boom; a guy line which connects a distal end of the mast and a distal end of the boom to each other; and a linking and retaining structure provided on the boom. The guy line includes; a guy link located closer to the mast and extending in a connection direction from the distal end of the mast toward the distal end of the boom; and a pair of guy cables located closer to the boom, extending in the connection direction, and spaced from each other at a distance in a left-right direction perpendicularly intersecting the connection direction, each of the guy cables having a cable proximal end connected to the guy link and a cable distal end connected to the distal end of the boom. The guy link has: a pair of guy link main bodies each extending in the connection direction and spaced from each other at a distance furtherer than the distance between the pair of guy cables in the left-right direction, each of the guy link main bodies having a link proximal end connected to the distal end of the mast; and a guy link coupling part connected to respective distal ends of the pair of guy link main bodies. The guy link coupling part has: a pair of link members spaced from each other in the left-right direction and linking the pair of guy cables and the pair of guy link main bodies to each other in the connection direction; and a coupling member extending in the left-right direction and connecting the pair of link members to each other in the left-right direction. The linking and retaining structure includes at least one first retainer provided on the boom for retaining the coupling member to restrict the coupling member from moving in a boom extension direction in which the boom extends from the crane main body. The at least one first retainer has: a first slope surface slanting to an inside of the boom as advancing in the boom extension direction; a second slope surface located closer to a distal position than the first slope surface in the boom extension direction, and slanting to an outside of the boom as advancing in the boom extension direction; and a recess part disposed between the first slope surface and the second slope surface in the boom extension direction and connecting the first slope surface and the second slope surface to each other to receive the coupling member of the guy link coupling part in a direction perpendicularly intersecting the boom extension direction and the left-right direction.

According to the configuration, the first retainer which can retain the coupling member of the guy link coupling part to restrict the coupling member from moving in the front-rear direction is located on the boom. The first retainer has: the first slope surface slanting inward of the boom, from a proximal position of the boom toward the distal end thereof: the second slope surface slanting outward of the boom, from a proximal position of the boom toward the distal end thereof; and the recess part disposed between the first slope surface and the second slope surface. Therefore, even if the guy link coupling part deviates from the predetermined accommodating position toward the proximal end of the boom due to the stretching of the guy cable in the operation, the first slope surface guides the coupling member thereover to thereby allow the guy link coupling part to move toward the distal end of the taper boom in the accommodating of the boom guy line. This configuration solves the deviation of the guy link coupling part in the front-rear direction. Moreover, the recess part disposed between the first slope surface and the second slope surface receives the coupling member fitting to the bottom thereof to thereby retain the coupling member in the front-rear direction. Consequently, the guy link coupling part restricted from moving in the front-rear direction is held on the boom in this state. This configuration can facilitate the accommodating of the guy link coupling part at the predetermined position.

The tensile force having occurred in each of the guy cable and the guy link coupling part is released therefrom when the deviation of the guy link coupling part in the front-rear direction is solved in the accommodating of the boom guy line. Accordingly, the pin connecting the guy cable and the guy link coupling part, and the pin connecting the cables constituting the guy cable to each other are easily removable. This can facilitate the disassembling of the boom. The accommodating of the guy link coupling part at the predetermined position leads to a success in connecting the guy cable and the guy link coupling part by the pin and connecting the cables constituting the guy cable to each other by the pin in a state where no tensile force occurs in the guy cable and the guy link coupling part. This can facilitate the assembling of the boom.

Particularly, this configuration makes it possible to guide the guy link coupling part, which is less likely to be liftable with a human power on the boom, toward the recess part of the first retainer in the air by utilizing slacking of the guy line attributed to a rotation (lowering) of the mast in the lying state of the boom.

In this configuration, the first slope surface preferably has: a first section having a predetermined gradient with respect to the boom extension direction; and a second section located closer to the distal position than the first section in the boom extension direction and having a gradient steeper than the gradient of the first section with respect to the boom extension direction.

According to the configuration, the first section and the second section of the first slope surface can smoothly guide the guy link coupling part thereover toward the recess part.

In this configuration, the first slope surface preferably has a larger maximum height from the recess part than a maximum height of the second slope surface from the recess part.

According to the configuration, the second slope surface located closer to the distal end of the boom when seen from the recess part has a relatively small height. Hence, the coupling member of the guy link coupling part can easily come out of the recess part, resulting in a smooth shift of the boom from the lying posture shown in FIG. 2 to an operation posture shown in FIG. 1.

In this configuration, the linking and retaining structure preferably further includes a contact member provided on the coupling member and movable over the first slope surface while contacting the first slope surface.

According to this configuration, the contact member can further smoothly guide the guy link coupling part toward the recess part by the contact with the first slope surface.

In this configuration, the contact member is preferably a roller supported by the coupling member rotatably about a rotation central axis extending in the left-right direction.

The configuration including the contact member having the rotatable roller can attain much smoother movement and accommodating of the guy link coupling part.

In this configuration, the linking and retaining structure preferably further includes at least one connection member which detachably connects the coupling member and the at least one first retainer in a state where the recess part receives the coupling member.

The configuration including the connection member which connects the coupling member and the first retainer can stably retain the guy line having been accommodated.

In this configuration, the at least one connection member is preferably supported by the first retainer and shiftable between a connected position for preventing the coupling member from moving relative to the first retainer and a disconnected position for permitting the coupling member to move relative to the first retainer.

This configuration can facilitate the accommodating and parting of the guy line to and from the boom by shifting the connection member between the positions.

In this configuration, the linking and retaining structure preferably further includes at least one second retainer provided on the boom for retaining the guy link coupling part to restrict the guy link coupling part from moving in the left-right direction.

The configuration including the second retainer can further stably retain the guy link coupling part.

In this configuration, the at least one second retainer preferably includes a pair of second retainers configured to respectively retain the pair of link members of the guy link coupling part.

The configuration including the pair of second retainers can further stably retain the guy link coupling part.

In this configuration, the first retainer preferably retains the guy link coupling part so that the guy link coupling part is at a fixed position relative to the distal end of the boom in the boom extension direction.

According to the configuration, the first retainer can retain the guy link coupling part at a fixed position relative to the distal end of the boom, and thus can stably retain the guy link coupling part regardless of stretching of the guy cable. As a result, this configuration facilitates a pin connection operation and a pin removal operation at the guy cable and the guy link coupling part.

The invention claimed is:

1. A crane comprising:
a crane main body;
a boom supported on the crane main body rotatably in a tilting direction;
a mast supported on the crane main body rotatably in the tilting direction behind the boom;
a guy line which connects a distal end of the mast and a distal end of the boom to each other; and
a linking and retaining structure provided on the boom, wherein
the guy line includes;
a guy link located closer to the mast and extending in a connection direction from the distal end of the mast toward the distal end of the boom; and
a pair of guy cables located closer to the boom, extending in the connection direction, and spaced from each other at a distance in a left-right direction perpendicularly intersecting the connection direction, each of the guy cables having a cable proximal end connected to the guy link and a cable distal end connected to the distal end of the boom,
the guy link having:
a pair of guy link main bodies each extending in the connection direction and spaced from each other at a distance further than the distance between the pair of guy cables in the left-right direction, each of the guy link main bodies having a link proximal end connected to the distal end of the mast; and
a guy link coupling part connected to respective distal ends of the pair of guy link main bodies,
the guy link coupling part having:
a pair of link members spaced from each other in the left-right direction and linking the pair of guy cables and the pair of guy link main bodies to each other in the connection direction; and
a coupling member extending in the left-right direction and connecting the pair of link members to each other in the left-right direction, and
the linking and retaining structure includes at least one first retainer provided on the boom for retaining the coupling member to restrict the coupling member from moving in a boom extension direction in which the boom extends from the crane main body,
the at least one first retainer having:
a first slope surface slanting to an inside of the boom as advancing in the boom extension direction;
a second slope surface located closer to a distal position than the first slope surface in the boom extension direction, and slanting to an outside of the boom as advancing in the boom extension direction; and
a recess part disposed between the first slope surface and the second slope surface in the boom extension direction and connecting the first slope surface and the second slope surface to each other to receive the coupling member of the guy link coupling part in a direction perpendicularly intersecting the boom extension direction, the recess part having a bottom to which the coupling member of the guy link coupling part fits and holding the coupling member from moving in the boom extension direction.

2. The crane according to claim 1, wherein the first slope surface has:
a first section having a predetermined gradient with respect to the boom extension direction; and
a second section located closer to the distal position than the first section in the boom extension direction and having a gradient steeper than the gradient of the first section with respect to the boom extension direction.

3. The crane according to claim 1, wherein the first slope surface has a larger maximum height from the recess part than a maximum height of the second slope surface from the recess part.

4. The crane according to claim 1, wherein the linking and retaining structure further includes a contact member provided on the coupling member and movable over the first slope surface while contacting the first slope surface.

5. The crane according to claim 4, wherein the contact member is a roller supported by the coupling member rotatably about a rotation central axis extending in the left-right direction.

6. The crane according to claim 1, wherein the linking and retaining structure further includes at least one connection member which detachably connects the coupling member and the at least one first retainer in a state where the recess part receives the coupling member.

7. The crane according to claim 6, wherein the at least one connection member is supported by the at least one first retainer and shiftable between a connected position for preventing the coupling member from moving relative to the at least one first retainer and a disconnected position for permitting the coupling member to move relative to the at least one first retainer.

8. The crane according to claim 1, wherein the linking and retaining structure further includes at least one second retainer provided on the boom for retaining the guy link coupling part to restrict the guy link coupling part from moving in the left-right direction.

9. The crane according to claim 8, wherein the at least one second retainer includes a pair of second retainers configured to respectively retain the pair of link members of the guy link coupling part.

10. The crane according to claim 1, wherein the at least one first retainer retains the guy link coupling part so that the guy link coupling part is at a fixed position relative to the distal end of the boom in the boom extension direction.

* * * * *